May 31, 1938.  R. C. McCLAY  2,119,136
COMBINED MOTION PICTURE AND SOUND REPRODUCER
Filed Nov. 30, 1934  2 Sheets-Sheet 1

INVENTOR
ROY C. McCLAY
BY
ATTORNEY

May 31, 1938.   R. C. McCLAY   2,119,136
COMBINED MOTION PICTURE AND SOUND REPRODUCER
Filed Nov. 30, 1934   2 Sheets-Sheet 2
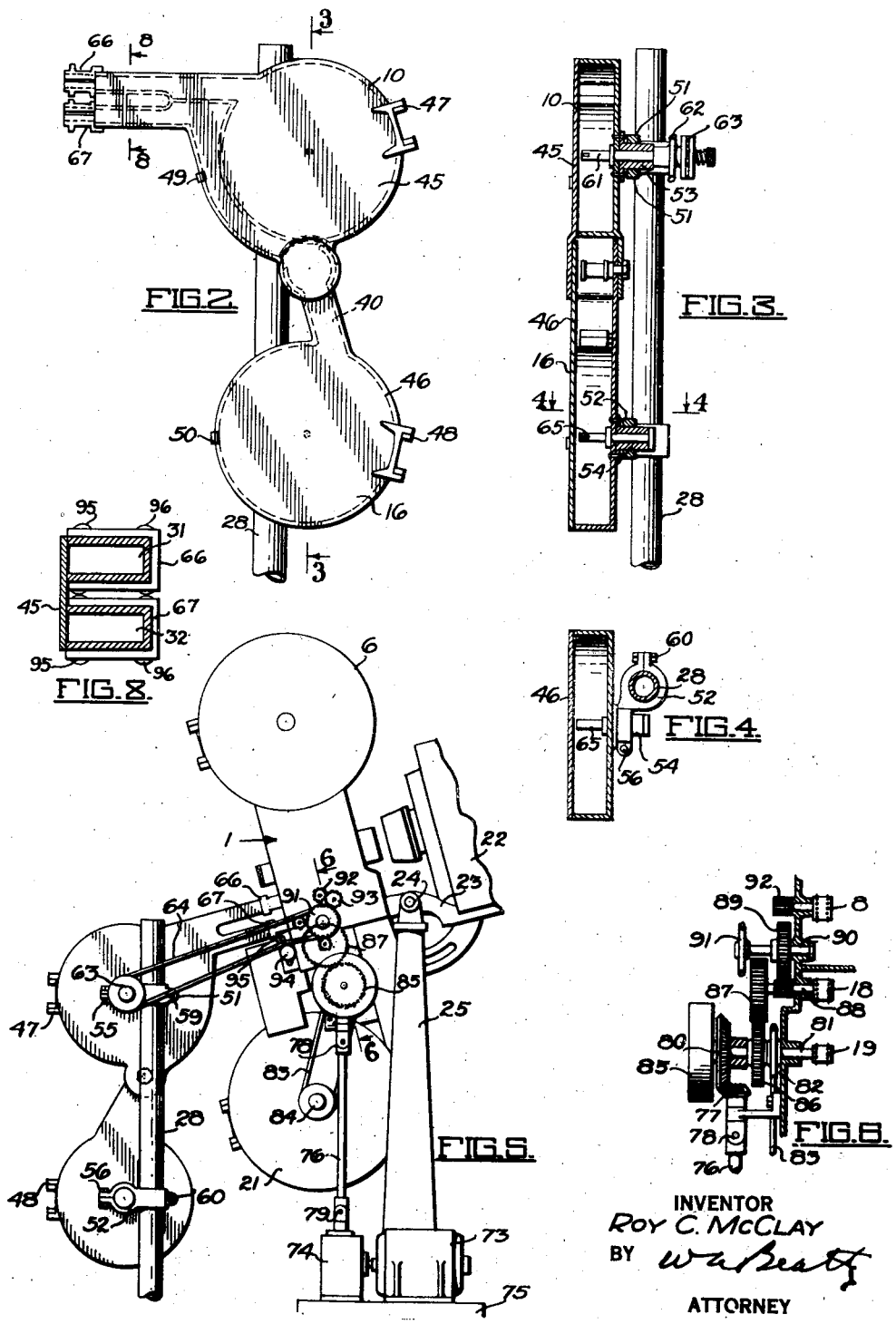
INVENTOR
ROY C. MCCLAY
BY *W. A. Beatty*
ATTORNEY Patented May 31, 1938

2,119,136

UNITED STATES PATENT OFFICE 2,119,136

COMBINED MOTION PICTURE AND SOUND REPRODUCER

Roy C. McClay, West Los Angeles, Calif., assignor to United Research Corporation, Long Island City, N. Y., a corporation of Delaware Application November 30, 1934, Serial No. 755,378

4 Claims. (Cl. 88—16.2)

This invention relates to combined motion picture and sound projectors and particularly to improvements in that type of apparatus disclosed and claimed in my co-pending application, Serial No. 635,965, which has matured into Patent No. 2,061,202, issued November 17, 1936, wherein a double film attachment is provided whereby a projector which is normally adapted to handle a single film bearing both picture and sound records may be converted to handle separate sound and picture films in synchronism.

This type of apparatus for double film projection is especially advantageous for "preview" purposes and the like where subsequent changes in the film are to be made. By projecting the picture and the sound on separate films, the expense of combining the two on one film may thus be eliminated until the picture is ready for its final form.

The present invention relates to a double film attachment as disclosed and claimed in my pending application referred to above, wherein the double film attachment is provided with a support which is independent of the usual projector pedestal. The object of the invention is to adjust the double film attachment with respect to its support so that it may conform to any tilted position of the projector. It is understood that it is necessary to provide for a tilt adjustment of the projector in order to accommodate different projector booths which are at different levels above their respective stages in different theatres. This object is accomplished by providing between the double film attachment and its support a tilt adjustment which will accommodate any angular or tilted adjustment of the projector. In the particular example illustrated herein, the double film attachment comprises upper and lower film magazines, the upper film magazine having formed integral therewith a portion of the film conduit for the lower magazine. The tilted adjustment is provided by flexibly coupling the film conduit for the lower magazine to its continuation which is integral with the upper film magazine, both of these magazines being provided with means for supporting them at different heights on a column which may be supported on a pedestal which is separate from the main pedestal of the projector. Preferably the film conduit for these magazines serve as fire traps.

For further details of the invention reference may be had to the accompanying illustrations wherein:

Fig. 2 is an elevational view of the combined film magazines and associated fire trapping passages according to my invention.

Fig. 3 is a sectional elevation view of the film magazines and is taken along the line 3—3 of Fig. 2.

Fig. 4 is a sectional plan view taken along line 4—4 of Fig. 3.

Fig. 5 is a rear view of the apparatus showing means for driving the take-up reels.

Fig. 6 is a sectional view taken along line 6—6 of Fig. 5.

Fig. 8 is a sectional view taken along line 8—8 of Fig. 2.

Figure 1:
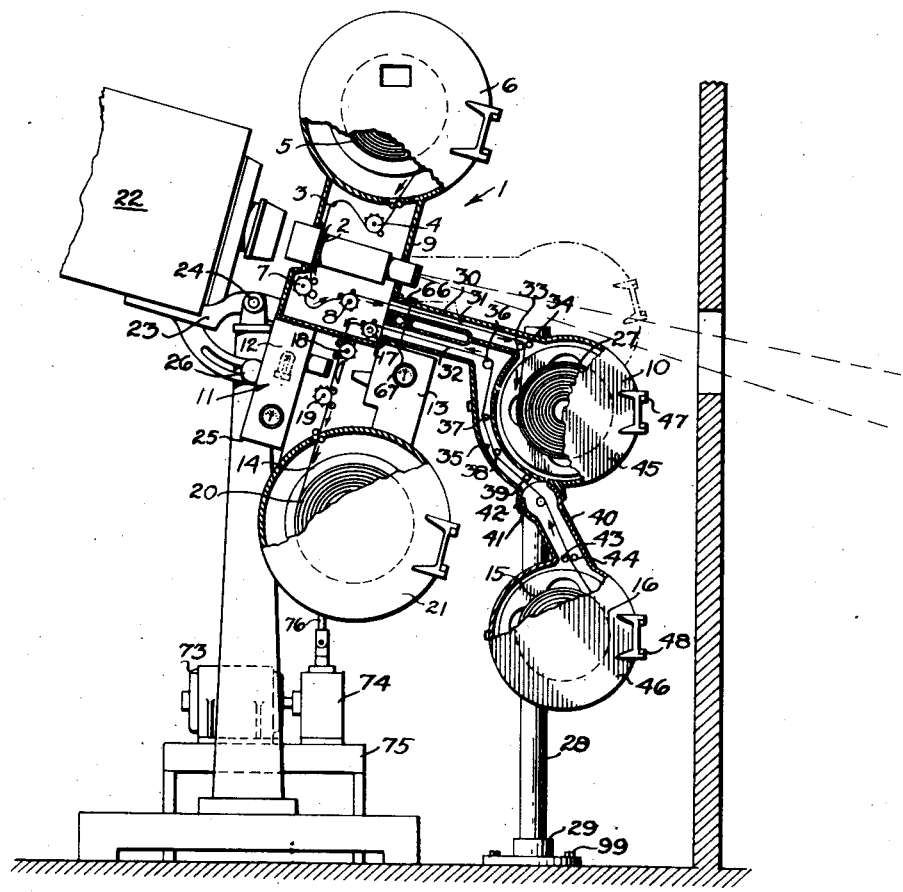
Fig. 1 is an elevational view, partly in section, of a preferred type of motion picture and sound reproducing machine used in conjunction with the present invention.
Figure 7:
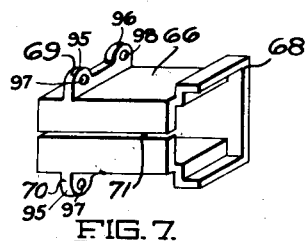
Fig. 7 is a perspective view of an attachment placed on the end of the fire traps so as to provide a substantially air tight passage therethrough.

Referring to Fig. 1, the projector 1 is of a conventional construction having a film gate 2 to which a picture film 3 is fed by a sprocket 4 from a supply reel 5 located in a magazine 6. An intermittent sprocket 7 driven by a Geneva mechanism or the like advances the film in a step by step motion past the film gate. From the sprocket 7 the film is fed onto a hold back sprocket 8 and thence out through an aperture in the front wall 9 of the projector and into a picture film take-up magazine 10 which will be more fully described hereinafter.

A sound reproducing unit 11 of the conventional type is provided below the projector head 1 and comprises generally an exciter lamp housing 12 and a photo-cell housing 13. Sound film 14 is drawn from a supply reel 15 in a film magazine 16 located below the picture film take-up magazine 10 and is fed by sprockets 17, 18 and 19 past the sound head 11 from whence it is drawn onto a sound film take-up reel 20 located in a magazine 21 below the sound head 11.

The projector proper and its accompanying lamp house 22 is secured to a bracket 23 which is pivotally mounted at 24 to the upper end of a pedestal 25. A suitable locking means 26 is provided to lock the projector in any required angular or tilted position.

Referring now to Figs. 1–5, it will be noted that both the upper magazine 10 housing the picture film take-up reel 27 and the lower magazine 16 housing the sound film supply reel 15 are mounted upon a vertical column 28 which is supported at its lower end by a base 29 which separate sound and picture films through said projector respectively.

2. A sound picture apparatus comprising a standard, two reel housings in vertical alignment adjustably mounted thereon, an articulate connection between said housings for providing movement therebetween when said housings are adjusted to different positions on said standard, a projector fixedly attached to the upper of said housings, a standard for said projector on which said projector is tiltable, a film conduit for one of said housings and connecting said housings and terminating in a conduit extending laterally adjacent the upper of said housings, and a film conduit for the upper of said housings extending laterally therefrom and adjacent said other laterally extending conduit, said laterally extending conduits being attached to said projector.

3. A sound picture reproducer comprising a picture projector having a side wall, a sound head, apertures in vertical alignment in said side wall, a vertical standard for said projector on which said projector is tiltable, two reel housings, one of which is fixedly attached to said projector, a vertical standard to which each of said housings is attached, an articulate joint inter-connecting said housings providing independent movement of each of said housings, film conduits extending from said housings respectively and communicating with said apertures respectively, said joint being included in one of said conduits, and film traversing means cooperating therewith for traversing separate sound and picture films through said projector and said sound head respectively.

4. A sound picture reproducer comprising a picture projector having a picture gate and a side wall, a standard for said projector, a sound head aperture in vertical alignment in said side wall, two reel housings, means for tilting said projector and housing about a point on said standard, a second standard for supporting said reel housings at different positions thereon determined by the tilt of said reproducer, film conduits extending from said housings respectively and communicating with said aperture respectively, one of said conduits joining said housings and being articulated to provide respective movement between said housings during adjustment thereof on said standard, and film traversing means cooperating with said apertures comprising an upper sprocket in the path of picture film from said picture gate to the upper of said apertures, said sprocket also being in the path of sound picture film from said picture gate to said sound head, and a lower sprocket in the path of said film from the lower one of said apertures to said sound head.

ROY C. McCLAY.